(12) United States Patent
Maletsky et al.

(10) Patent No.: US 8,261,072 B2
(45) Date of Patent: Sep. 4, 2012

(54) METHOD AND SYSTEM FOR SECURE EXTERNAL TPM PASSWORD GENERATION AND USE

(75) Inventors: Kerry D. Maletsky, Monument, CO (US); Nathanael J. Bohlmann, Colorado Springs, CO (US)

(73) Assignee: Atmel Corporation, San Jose, CA (US)

( * ) Notice: Subject to any disclaimer, the term of this patent is extended or adjusted under 35 U.S.C. 154(b) by 1027 days.

(21) Appl. No.: 11/607,504

(22) Filed: Nov. 30, 2006

(65) Prior Publication Data

US 2007/0226787 A1 Sep. 27, 2007

Related U.S. Application Data

(60) Provisional application No. 60/785,870, filed on Mar. 24, 2006.

(51) Int. Cl.
*H04L 29/06* (2006.01)
*G06F 7/04* (2006.01)
*H04L 9/00* (2006.01)

(52) U.S. Cl. ........ 713/168; 713/169; 713/170; 713/171; 713/172; 713/173; 726/27; 726/28; 726/29; 726/30

(58) Field of Classification Search .................... 713/168
See application file for complete search history.

(56) References Cited

U.S. PATENT DOCUMENTS

| | | | |
|---|---|---|---|
| 6,061,464 A | 5/2000 | Leger | |
| 6,202,151 B1 | 3/2001 | Musgrave et al. | |
| 6,219,439 B1 | 4/2001 | Burger | |
| 6,256,737 B1 | 7/2001 | Bianco et al. | |
| 6,289,114 B1 | 9/2001 | Mainguet | |
| 6,459,804 B2 | 10/2002 | Mainguet | |
| 6,532,298 B1 | 3/2003 | Cambier et al. | |
| 6,553,494 B1 | 4/2003 | Glass | |
| 6,697,947 B1 | 2/2004 | Matyas, Jr. et al. | |
| 6,741,729 B2 | 5/2004 | Bjorn et al. | |
| 6,766,040 B1 | 7/2004 | Catalano et al. | |
| 6,819,219 B1 | 11/2004 | Bolle et al. | |
| 6,957,337 B1 | 10/2005 | Chainer et al. | |
| 6,968,060 B1 | 11/2005 | Pinkas | |
| 6,993,659 B2 | 1/2006 | Milgramm et al. | |
| 7,024,562 B1 | 4/2006 | Flink et al. | |
| 7,231,070 B2 | 6/2007 | Bjorn et al. | |
| 7,310,732 B2 | 12/2007 | Matsuyama et al. | |

(Continued)

FOREIGN PATENT DOCUMENTS

TW 200517976 7/2005

(Continued)

OTHER PUBLICATIONS

"U.S. Appl. No. 11/603,474, Non-Final Office Action mailed Dec. 19, 2008", 20 pgs.

(Continued)

*Primary Examiner* — Longbit Chai
(74) *Attorney, Agent, or Firm* — Fish & Richardson P.C.

(57) ABSTRACT

Aspects of the present invention include a method and system for generating a secure access code at a remote device in communication with a computer system having a secure storage device; conveying the secure access code to the system secure storage device; receiving the secure access code at the system secure storage device with unique data characteristics associated with remote device; and, securely providing content to the remote device.

48 Claims, 5 Drawing Sheets

U.S. PATENT DOCUMENTS

| | | |
|---|---|---|
| 2002/0016913 A1 | 2/2002 | Wheeler et al. |
| 2002/0046336 A1 | 4/2002 | Kon et al. |
| 2002/0056043 A1 | 5/2002 | Glass |
| 2002/0104006 A1 | 8/2002 | Boate et al. |
| 2002/0186838 A1 | 12/2002 | Brandys |
| 2003/0014372 A1 | 1/2003 | Wheeler et al. |
| 2003/0023882 A1 | 1/2003 | Udom |
| 2003/0051133 A1 | 3/2003 | Pearson |
| 2003/0056100 A1 | 3/2003 | Beatson |
| 2003/0070079 A1 | 4/2003 | Cromer et al. |
| 2003/0110372 A1 | 6/2003 | Proudler |
| 2003/0115475 A1 | 6/2003 | Russo et al. |
| 2003/0115490 A1 | 6/2003 | Russo et al. |
| 2003/0163710 A1 | 8/2003 | Ortiz et al. |
| 2004/0193888 A1 | 9/2004 | Wiseman et al. |
| 2005/0137889 A1* | 6/2005 | Wheeler ............................ 705/1 |
| 2005/0138393 A1* | 6/2005 | Challener et al. ............. 713/186 |
| 2005/0138434 A1 | 6/2005 | Catherman et al. |
| 2005/0149547 A1 | 7/2005 | Wight et al. |
| 2005/0228993 A1 | 10/2005 | Silvester et al. |
| 2005/0229007 A1 | 10/2005 | Bolle et al. |
| 2005/0229008 A1 | 10/2005 | Crane |
| 2005/0244037 A1 | 11/2005 | Chiu et al. |
| 2005/0246552 A1 | 11/2005 | Bade et al. |
| 2005/0257073 A1 | 11/2005 | Bade et al. |
| 2005/0286746 A1 | 12/2005 | Silvester |
| 2006/0000891 A1 | 1/2006 | Bonalle et al. |
| 2006/0046842 A1 | 3/2006 | Mattice et al. |
| 2006/0080528 A1 | 4/2006 | Ellison et al. |
| 2006/0115128 A1 | 6/2006 | Mainguet |
| 2006/0282680 A1 | 12/2006 | Kuhlman et al. |
| 2007/0006169 A1* | 1/2007 | Iliev et al. ..................... 717/131 |
| 2007/0050303 A1 | 3/2007 | Schroeder et al. |
| 2007/0226496 A1 | 9/2007 | Maletsky et al. |
| 2007/0226514 A1 | 9/2007 | Maletsky |
| 2007/0226515 A1 | 9/2007 | Maletsky |
| 2007/0226787 A1 | 9/2007 | Maletsky et al. |
| 2007/0237366 A1 | 10/2007 | Maletsky |
| 2010/0194571 A1 | 8/2010 | Ortiz et al. |

FOREIGN PATENT DOCUMENTS

| | | |
|---|---|---|
| WO | WO-00/065770 | 11/2000 |
| WO | WO-2000065770 A1 | 11/2000 |
| WO | WO-03007125 A2 | 1/2003 |
| WO | WO-2003007125 A2 | 1/2003 |
| WO | WO-2007112023 A2 | 10/2007 |
| WO | WO-2007112023 A3 | 10/2007 |

OTHER PUBLICATIONS

"U.S. Appl. No. 11/603,445, Non-Final Office Action mailed Jan. 21, 2009", 17 pgs.

"U.S. Appl. No. 11/603,495, Non-Final Office Action mailed Dec. 8, 2009.", 15 pgs.

"U.S. Appl. No. 11/603,495, Response filed Jun. 8, 2010 to Non Final Office Action mailed Dec. 8, 2009", 11 pgs.

"U.S. Appl. No. 11/633,045 Non-Final Office Action mailed Jan. 13, 2010", 14 pgs.

U.S. Appl. No. 11/603,495 Non-Final Office Action mailed Sep. 7, 2010, 13 pgs.

International Application Serial No. PCT/US07/07295, International Search Report mailed Dec. 20, 2007, 1 pg.

International Application Serial No. PCT/US07/07295, Written Opinion mailed Dec. 20, 2007, 3 pgs.

"U.S. Appl. No. 11/603,496, Final Office Action mailed Feb. 18, 2011", 14 pgs.

U.S. Appl. No. 11/633,045, Supplemental Notice of Allowability mailed Aug. 5, 2010, 7 pgs.

U.S. Appl. No. 11/633,045, Response filed Jun. 10, 2010 to Non-Final Office Action mailed Jan. 13, 2010, 8 pgs.

U.S. Appl. No. 11/633,045, Notice of Allowance mailed Jul. 27, 2010, 14 pgs.

* cited by examiner

METHOD AND SYSTEM FOR SECURE EXTERNAL TPM PASSWORD GENERATION AND USE

CROSS REFERENCE TO RELATED APPLICATIONS

Under 35 U.S.C. 119(e), this application claims the benefit of U.S. Provisional Application No. 60/785,870, filed Mar. 24, 2006. This application is also related to co-pending U.S. patent applications filed concurrently herewith, as Ser. No. 11/633,045, entitled "Method And System For Secure External TPM Password Generation And Use", Ser. No. 11/603,445, entitled "Secure Biometric Processing System And Method Of Use", Ser. No. 11/603,474, entitled "Secure Biometric Processing System And Method Of Use", all of which are incorporated herein by reference.

FIELD OF THE INVENTION

The present invention relates to the secured methodology and operation of securing operations with personal computers (PCs) and their associated peripherals, and more particularly, relates to generating and utilizing secured passwords for a Trusted Platform Module (TPM) based system as between PCs and their remote devices, during normal operations.

BACKGROUND OF THE INVENTION

It is widely known that the use of passwords, keycodes and other basic secret-based accesses for PCs and PC-based systems are vulnerable to physical and sometimes logical attacks. Inadequate security solutions have often, heretofore, been widely tolerated as the risks were perceived to be low and the proposed solutions were viewed as complex and intrusive to ease of use. However, whether a user's personal creation of a password is overly simplistic (e.g., birthdate) and can therefore be readily guessed, or a user's system comprises malware unknown to the user thereby making the user's use of an even more secure high-entropy password equally subject to attack, secure access to systems is at high risk in today's environment.

Traditional security mechanisms such as encryption keys, digital certificates and firewalls often are not as safe as first believed, as most of these mechanism store the security information (typically a key) on an unprotected hard drive and/or in unprotected memory. As a result, these traditional mechanisms may be targeted for attack by unauthorized users, due to their vulnerabilities.

Software attacks, viral applications, password sniffers, and targeted spoofing attempts often cause users to inadvertently surrender their secure information (such as passwords and other access data) from their systems that they had previously assumed was well-protected. Similarly, unauthorized changes to platform configurations, which thereby allow for access and misuse of system devices and their content, are on the rise. Additionally, a user's set of risks can readily vary from day to day without predictability, even though that same user's routine of utilizing the same computer, in the same location, does not vary. Both single factor (e.g., password) and dual factor (e.g., username and password) identity and security mechanisms, whether on the system-side or part of a peripheral device, remote or otherwise, are proving to be inadequate in today's environment.

It has also become the recent objective of certain semiconductor manufacturers to seek to develop specifications for architectures that promote trusted computing and security technologies across multiple platforms, peripherals and related devices. Atmel Corporation, along with others, sought to develop the TPM to conform to industry standard open specifications, issued by the non-for-profit corporation Trusted Computing Group™ (TCG). An objective of these standards is to increase security protections and reduce the vulnerability faced by hardware and software systems, particularly as these systems often face malicious or inadvertent corruption or attack. Functionally, by way of example, these standards provide for: (1) asymmetric functions for on-chip key pair generation using a hardware random number generator and signature and decryption operations, (2) secure storage of "hash" values representing platform configuration information in Platform Control Registers (PCRs), (3) endorsement key which can be used by an owner to anonymously establish that identity keys were generated in a TPM without identifying which TPM generated the identity key, and (4) initialization and management functions that allow an owner to take control of the system different from the user.

As a result of these efforts, TPMs have been developed and embedded into product offerings that implement these standards. For example, a TPM may be a silicon-based component affixed in a device that can store digital keys, certificates and passwords. As a further example, a TPM may also be a secure storage chip for unique Public Key Infrastructure (PKI) key pairs and credentials, and is often affixed to the motherboard of a PC. Typically each TPM chip is considered a fixed token that can be used to enhance user authentication, data, communications and platform security as the information it contains is more secure external software attacks. Typically, users are authenticated by cryptographic operations using keys or identities (IDs) stored in the TPM. The TPM is designed to be more resistant to logical and physical attacks.

Atmel produces a variety of products including security processors that protect the end user's privacy by providing tamper-proof storage and management of the user's identity, passwords and encryption keys. TPM chips use standard software interfaces and often work with other security methodologies to improve interoperability across multiple platforms.

However, ensuring the security of codes and access, physically and logically, even within this environment has its challenges. Despite the platform having a TPM, where it is possible to determine and authenticate whether trusted-state configuration parameters have been corrupted, activities external to TPM, such as authorization to initialize or to use keys stored on the TPM require external inputs, and thereby create an opportunity for malicious behavior and risk exposure.

Typically, the inadvertent or malicious detection of the codes and secrets at their origination is of greatest risk, be they passwords created by a user at their system or be they pre-loaded access codes provided from a third party in their environment. Unfortunately, the need to reduce the risk of security and integrity exposures to the user's systems while permitting the user to avail reasonable access methodologies with robust systems remains a concern. Thus, there is a continuing demand for further contributions in this area of technology.

Accordingly, there is a need to reduce the risk of exposed security and sacrificed integrity to the user's systems while permitting the user to avail reasonable access methodologies, and for the secure generation and use of accesses, codes and secrets for a robust system with remote devices that does not permit the inadvertent or malicious detection of the codes and secrets at their point of origination or during conveyance thereafter within the system. The present invention addresses this need.

SUMMARY OF THE INVENTION

A method and system for secure external TPM password generation and use is disclosed. The method and system comprises generating a secure access code at a remote device in communication with a computer system having a secure storage device which may be a TPM; conveying the secure access code to the system secure storage device; receiving the secure access code at the system secure storage device with unique data characteristics associated with remote device; and securely providing content to remote device.

Another embodiment of the present invention provides a technique to employ a secure methodology for ensuring, with confidential integrity, a password has been generated at a remote location whereafter the password is securely utilized during operation by a system having a TPM.

Other embodiments include unique apparatus, devices, systems, and methods involving the secure generation and utilization of secure access codes in a system being capable of communications with remote devices.

Further embodiments, forms, objects, features, advantages, aspects, and benefits of the present application shall become apparent from the detailed description and drawings included herein.

DETAILED DESCRIPTION

The present invention relates to the secured methodology and operation of securing operations with personal computers (PCs) and their associated peripherals, and more particularly, relates to generating and utilizing secured passwords for a Trusted Platform Module (TPM) based system as between PCs and their remote devices, during normal operations. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

One embodiment of the present invention includes a method comprising generating a secure access code at a remote device in communication with a computer system having a secure storage device which may be a TPM; conveying the secure access code to the system secure storage device; receiving the secure access code at the system secure storage device with unique data characteristics associated with remote device; and, securely providing content to the remote device.

Another embodiment of the present invention includes a TPM-based computer system comprising one or more central processing units (CPUs) connected to one or more internal system busses, having random access memory (RAM), read-only memory, and at least one input/output adapter, which supports various I/O devices, a user interface adapter, a means for generating a secure access code at a remote device in communication with the system having a secure storage device; conveying the secure access code to the system secure storage device; receiving the secure access code at the system secure storage device with unique data characteristics associated with remote device; and, securely providing content to the remote device.

Figure 1:
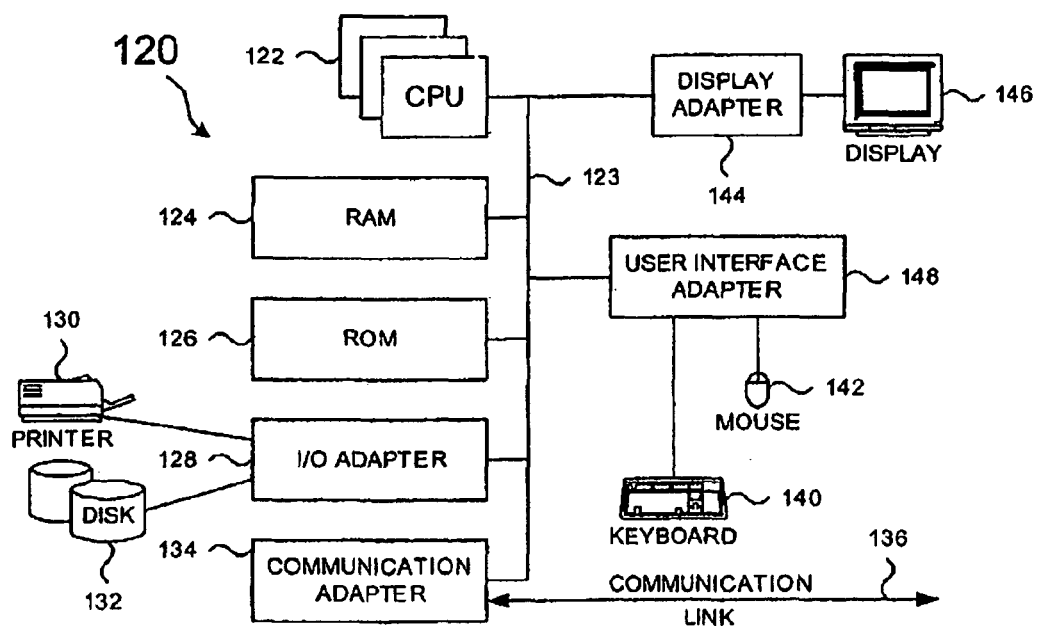
FIG. 1 depicts a typical computer architecture of a data processing system.

FIG. 1 represents a typical computer architecture of a data processing in which the present invention may be implemented. Data processing system 120 contains one or more central processing units (CPUs) 122 connected to internal system bus 123. System bus 123 also interconnects random access memory (RAM) 124, read-only memory 126, and input/output adapter 128, which supports various I/O devices, such as printer 130, disk units 132, or other devices including but not limited to biometric devices, audio output systems, etc. (not shown). System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Although FIG. 1 is a typical configuration, those of ordinary skill in the art will appreciate that the hardware and functionality therein may vary depending on the system implementation. For example, the system may have one or more processors, one or more remote devices, and one or more types of volatile and non-volatile memory. Other peripheral devices may be used in addition to or in place of the hardware depicted in FIG. 1. The depicted examples are not meant to imply architectural limitations with respect to the present invention.

Figure 2:
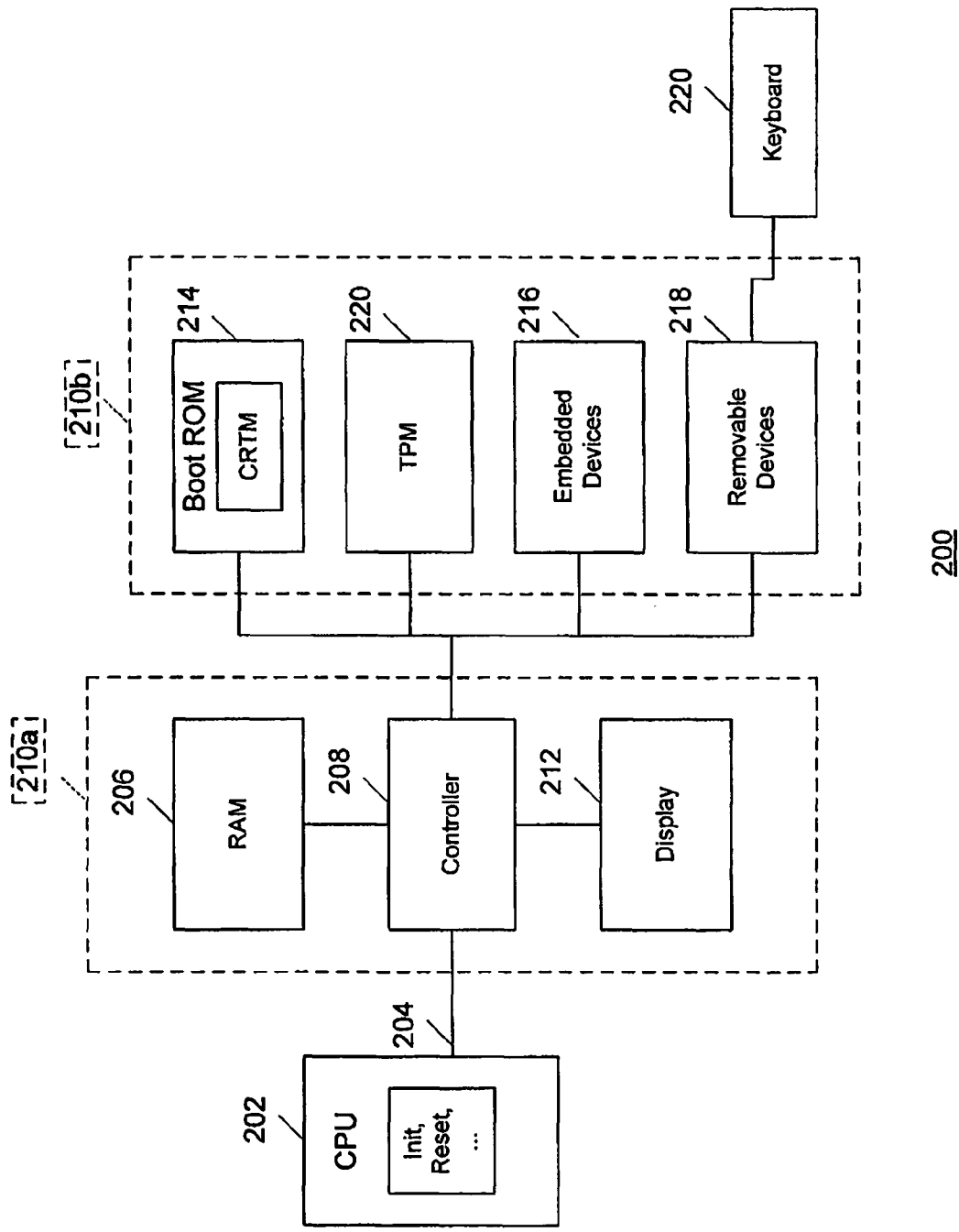
FIG. 2 represents a typical reference architecture for a data processing system, in a different configuration than that of FIG. 1, with Trusted Building Block components of a trusted platform architecture, in which the present invention may be implemented.

FIG. 2 represents a typical reference architecture 200 for a data processing system, in a different configuration than that of FIG. 1, with Trusted Building Block components (TBB) 210 of a trusted platform architecture 200, in which the present invention may be implemented. Referring to FIG. 2, a CPU 202 is coupled via a bus 204 to a first group of TBB components 210a. The first group of TBB components 210a include RAM 206, a controller 208 and a display 212. The first group of TBB components 210a is further coupled to a second group of trusted building blocks 210b. The second group of trusted building blocks 210b include Boot ROM 214, TPM 220, one or more of embedded devices 216, and one or more of removable devices 218. Removable devices 218 are coupled to a keyboard 222.

Roots of trust are components in a computer system that must be "trusted" or have utmost integrity as there exist limited checks on these components to identify malicious or similar activity. According to TCG:

"A complete set of Roots of Trust has at least the minimum functionality necessary to describe the platform characteristics that affect the trustworthiness of the platform. There are commonly three Roots of Trust in a trusted platform; a root of trust for measurement (RTM), root of trust for storage (RTS) and root of trust for reporting (RTR). [ . . . ] Typically the normal platform computing engine is controlled by the core root of trust for measurement (CRTM). The CRTM is the instructions executed by the platform when it acts as the RTM," (TCG Specification, Revision 1.2, 28 Apr. 2004, p6, of which reference to the specification is incorporated herein). The RTS is a computing engine capable of maintaining an accurate summary of values of integrity digests and the sequence of digests. The RTR is a computing engine capable of reliably reporting information held by the RTS. Reference architecture also depicts the TPM 220 interoperably in communications to functions typically associated with a motherboard or co-resident thereon.

Figure 3:
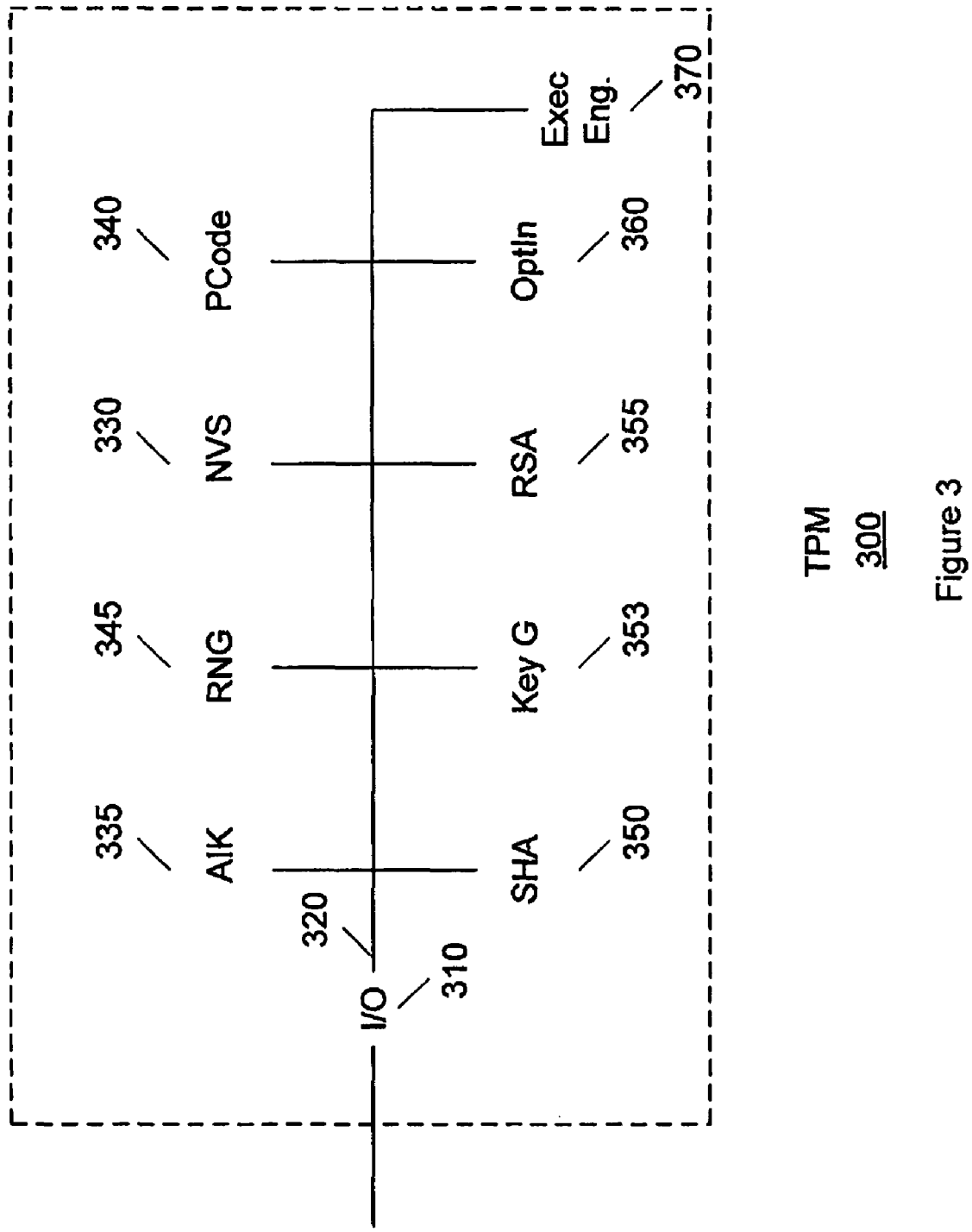
FIG. 3 depicts the building blocks for a TPM, such as that of FIG. 2, supporting root of trust for storage (RTS) functionality.

FIG. 3 depicts the building blocks 310-399 for a TPM 300, such as that of FIG. 2 (FIG. 2, 220), supporting RTS functionality. Input/Output block 310 provides for information flow over the communications bus 320 and performs protocol encoding/decoding suitable for communication over external and internal buses. Non-Volatile Storage block 330 is used to store Endorsement Key (EK), Storage Root Key (SRK), owner authorization data and persistent flags can be implemented in therein. Attestation Identity Keys (AIK) block 335 are stored as Blobs in persistent external storage external to the TPM 300. Program Code block 340 is typically firmware for measuring platform devices and is logically the CRTM. Random Number Generator (RNG) block 345 is preferably a true random-bit generator used to seed random number generation (RNG), which may be used for key, password, code or other similar access identifier generation, nonce creation and to strengthen pass phrase entropy. Sha-1 Engine block 350 generates digests. RSA Key Generation block 353 standardizes the associated algorithm for associated use with the TPM 300. The RSA Engine block 355 is used for signing with signing keys, encryption and decryption with storage keys, and decryption with the EK. Opt-In block 360 is an activation or deactivation status of TPM 300 being deactivated or fully enabled. Execution Engine block 370 runs program code and performs initialization and measurement storage by the TPM 300.

Typically, for TPM, an associated Protected Storage Command (PSC) of the TPM RTS component is TPM_CreateWrapKey. The TPM_CreateWrapKey command typically uses public-key cryptography to prepare unique keys for private key operations at TPM endpoints. The TPM_CreateWrapKey command generates an RSA key and attaches the authorization secret to the RSA key. Since the authorization secrets are passed to the TPM for the TPM_CreateWrapKey command, the input to and the execution of the authorization input protocol on the local system typically requires that insecure insecure software be employed, thereby causing vulnerability to the system. The present invention overcomes the limitation of this situation.

Figure 4:
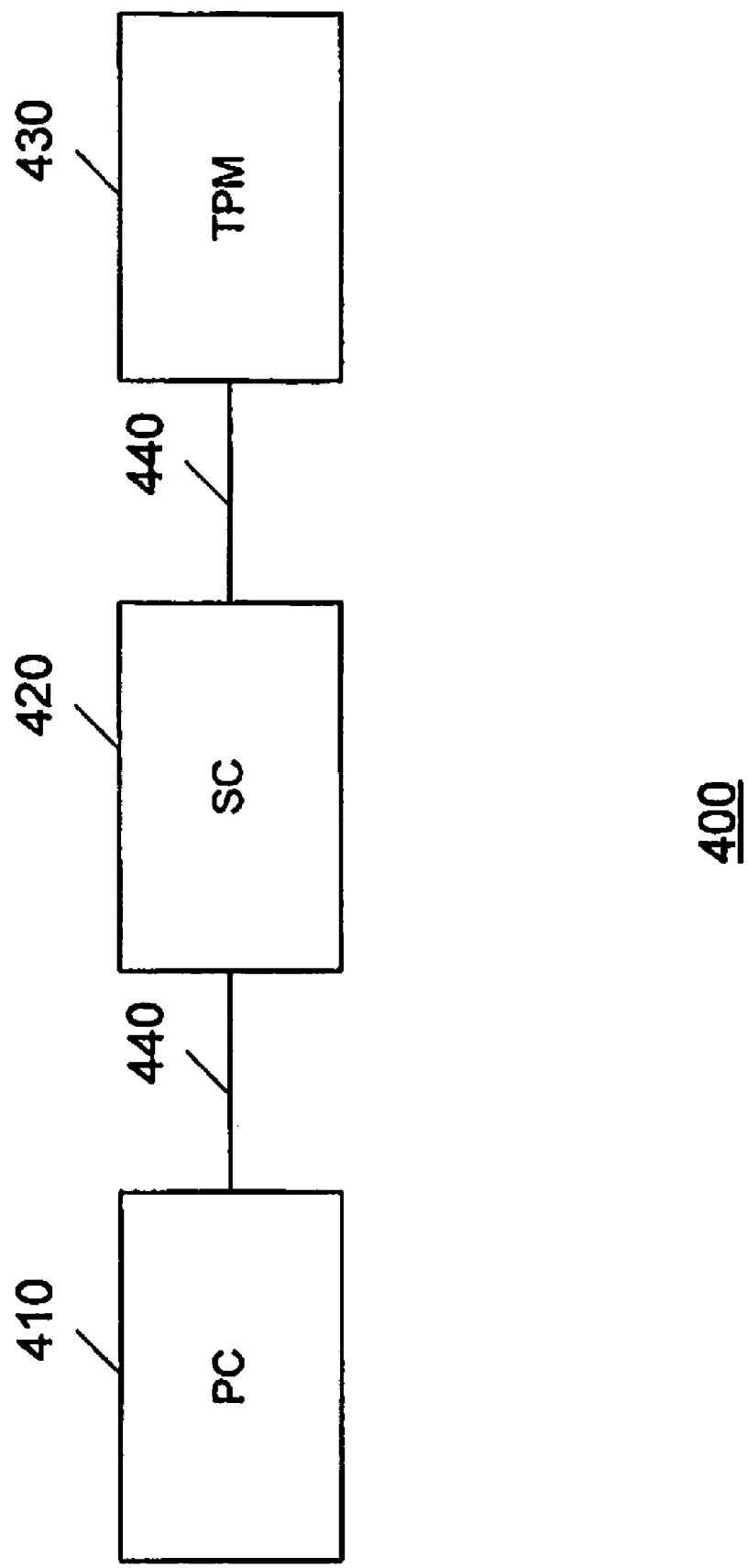
FIG. 4 depicts a TPM-based system that includes biometric capability, in accordance with a preferred embodiment of the present invention.

FIG. 4 depicts a TPM-based system 400 that includes remote device capability 420, in accordance with a preferred embodiment of the present invention. In system 400, a TPM-based computing device 410 is interoperably interconnected and capable of direct or indirect communication with a secure generator 420 via a bus 440. The bus 440 could be a less secure channel such as a CPC bus, SPC bus, USB bus or other I/O protocols. The secure generator 420 is also interoperably interconnected and capable of direct communication 450 with a remote input receiving device, such as but not limited to a biometric device, as block 460. The input receiving device is not in communication with an external or third party to the system. The secure generator may be a chip, chip set, remote device, encryption processor, smart card or other secure code generation means.

In operation the present invention can securely generate an access code (i.e., password, authorization secret, and the like) in the remote device and securely convey the access code to the TPM of the system. TPM keys require usage authorization information to be attached to them for their associated use. Such usage authorization information is generated by the secure generator and sent to the TPM when the key is generated. Once generated, the secure generator can also be used to securely authenticate subsequent uses of the key, as both the secure generator and the TPM recognize a common access code or secret. This access code is preferably not known to the user to ensure its security.

The present invention, in various embodiments, utilizes a common authorization secret (CAS) between keys or data elements associated with the TPM and the secure generator. The secure generator Manager generates a storage root key (SRK) for the secure generator. The secure generator User generates an identity profile (also referred to as a parent template), in association with the remote input receiving device, attached to the SRK. The User attaches the identity CAS to the profile. The Owner generates the TPM SRK. The TPM User generates user parent key (UPK) attached to the TPM SRK where the authorization secret may be the CAS. In a preferred embodiment, the secure generator SRK and TPM SRK are set up for the system at the time of initial purchase, although such is not required for the present invention.

The User then initiates the inputting of unique data into the remote device and details of the unique data are extracted. From the unique extracted data, a new identity profile (also referred to as a child template) is generated with the parent being the remote input receiving device SRK. The new identity profile is transmitted to the system, encrypted, and also loaded into the input receiving device.

The User then saves the two TPM generated nonces associated with a shared OSAP secret generation by initiating an Object-Specific Authorization Protocol (OSAP) session on the TPM. The two nonces are saved for transmission to the remote input receiving device in a subsequent step.

The remote input receiving device then prompts the user or acquires via another means input of the unique data associated with its characteristics, at or from the device. The remote input receiving device, having acquired and authenticated the unique data, then generates the shared OSAP secret from the identity profile using the two OSAP nonces previously saved for transmission and thereafter transmitted to the remote input receiving device.

Once the CAS is acquired the remote input receiving device generates a random authorization secret (RAS). A command is sent to the remote input receiving device to decrypt some identity profile and attach the RAS to the identity profile (formerly the new identity profile), and re-encrypt update identity profile. The command also encrypts the RAS with the shared OSAP secret using the TPM encrypted authentication protocol, and transmits the encrypted information to the system. In a preferred embodiment, the system would then load the updated identity profile onto the remote input receiving device for later use.

The system, having received the encrypted information from the remote input receiving device transmits the information to the TPM as part of the TPM_CreateWrapKey command. The TPM then generates a unique RSA key which has as its authentication secret the RAS. In a preferred embodiment, the TPM would then load the key into the TPM for later use.

In a preferred embodiment the secure generator is a secure chip or a secure processing unit configured and arranged in association with the remote device. In another preferred embodiment, the remote device is an input-centric device capable of receiving data as input in association with unique identifying characteristics of the user of the system, such as but not limited to biometric characteristics. Other examples include, but, equally, are not limited to: smart cards, USB flash disk with security engine, biometric processor and software and hardware combinations operating on a remote server.

Example of the Present Invention in a Preferred Arrangement

Figure 5:
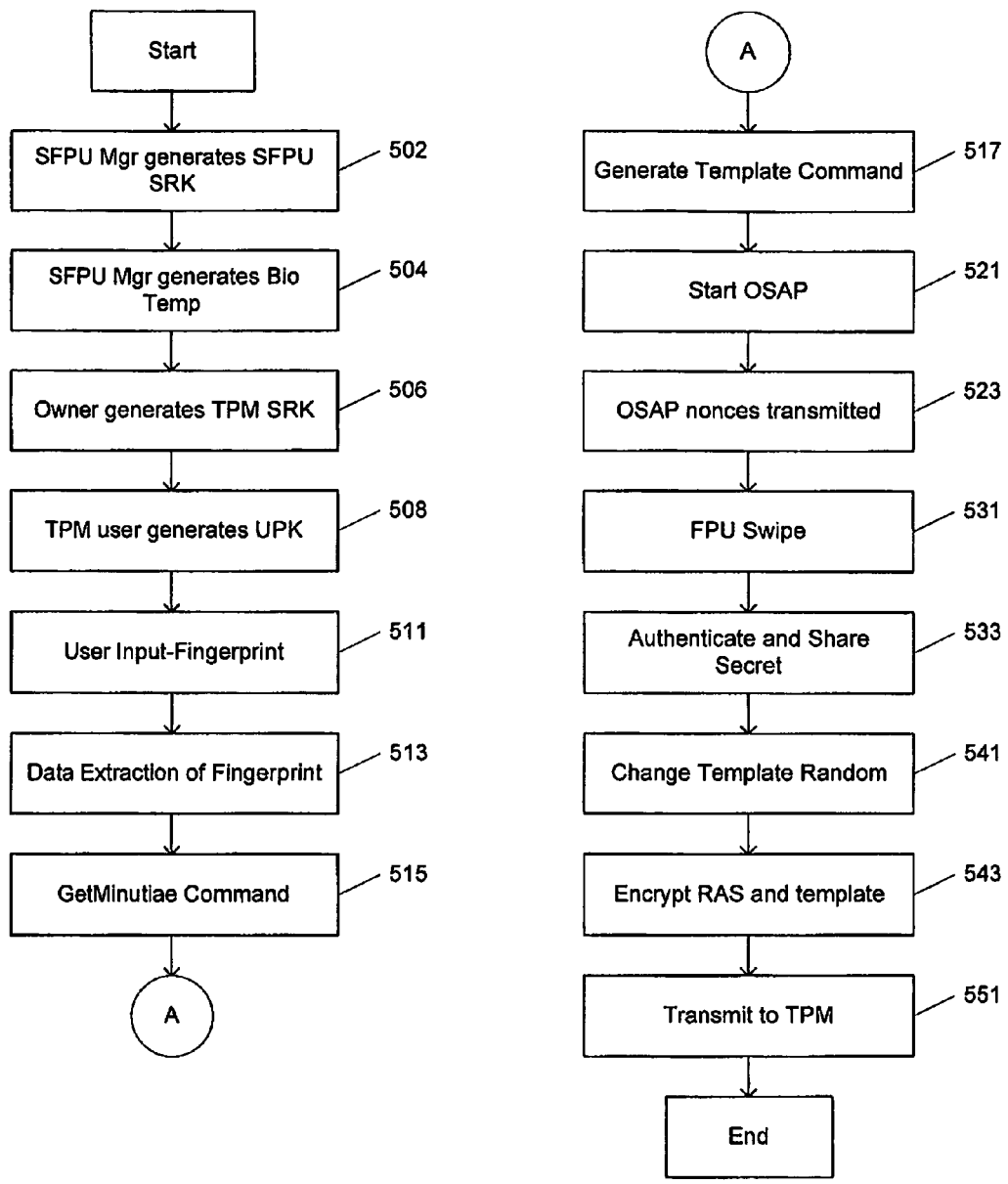
FIG. 5 depicts a particular preferred arrangement process of generating and utilizing a commons shared secret of the present invention.

For example, in a particular preferred arrangement, a secure fingerprint processing unit (SFPU) is interoperably interconnected and capable of direct communication with a biometric device capable of receiving unique fingerprint characteristics of a user. In this preferred arrangement a common access secret (CAS, also known as the ParentPassword) between the TPM and the SFPU is utilized for initial and all subsequent uses to generate sets of TPM keys and SFPU templates that each share a unique Random Access Secret (RAS). FIG. 5 depicts a particular preferred arrangement process 500 of generating and utilizing a common shared secret of the present invention.

The SFPU Manager generates the SFPU SRK at 502. The User then inputs fingerprint data by swiping a finger of the user on the SFPU at 504. The SFPU extracts fingerprint characteristic data (e.g. minutiae) at 506. From the minutiae, a new biometric template (also referred to as a parent template) is generated using a command such as SFPU_GetMinutiae, at 508. The parentPassword is attached thereto and this new template is encrypted with the parent being the SFPU SRK and transmitted to the system using a command such as SFPU_GenerateTemplate, at 520.

The TPM Owner generates the TPM SRK at 510. The User generates user parent key (UPK) attached to the SRK where the authorization secret for the UPK is also the same parentPassword (as attached to the parent template in the SFPU) at 512. Preferably, but not necessarily, the parentPassword is set up for all components of the system at the time of initial system acquisition.

The User then inputs fingerprint data by swiping a finger of the user on the SFPU at 514. The SFPU extracts fingerprint characteristic data (e.g., minutiae) at 516. From the minutiae, a new biometric template (also referred to as a child template) is generated using a command such as SFPU_GetMinutiae, at 518. The new biometric template is encrypted with the parent being the SFPU SRK and transmitted to the system using a command such as SFPU_Generate Template, at 520.

Although in this embodiment, the SFPU SRK is used to encrypt the parent and child templates, one of ordinary skill in the art recognizes that any other SFPU key could be used to encrypt these templates and that would be within the spirit and scope of the present invention. Equally, while the TPM SRK is used to encrypt the parent and child keys, any other key could be used to encrypt these keys.

The User then starts the parent key OSAP session on the TPM using the command TPM_OSAP, at 522, and then saves the two OSAP nonces associated with the shared OSAP secret generation for transmission to the SFPU in a subsequent step, at 524.

The SFPU needs to first generate the same shared OSAP secret as the TPM, which requires knowledge of the parentPassword. The SFPU acquires the parentPassword from the parent template by first prompting the user to swipe a finger at the SFPU, using a command such as SFPU_GetMinutiae, at 526. Depending which finger is used by the user, a variation in the access may occur in association with the authenticating profile (parent or child) which is identified.

The SFPU, having acquired the (parent) fingerprint data, authenticates the data, generates the shared OSAP secret from the parentPassword stored in the parent template and the two parent OSAP nonces transmitted to the SFPU, and saves the data, using a command such as SFPU_OSAPStart, at 528.

In an embodiment the RAS is then generated, via step 530, and held internally for later use. Although in this embodiment, the RAS is generated at this point, one of ordinary skill in the art recognizes that the RAS could be generated at various points in the process and that would be within the spirit and scope of the present invention.

Since the encrypted child template remains in the system, a command, such as SFPU_ChangeTemplateRandom, is sent to the SFPU, at 532, to (1) decrypt the template, (2) attach the RAS thereto, and (3) re-encrypt the template. The command also encrypts the RAS with the shared OSAP secret, and transmits such with the encrypted template to the system, at 534. In a preferred embodiment, the system would then load the new child template onto the SFPU for later use.

The system, having received the encrypted RAS from the SFPU, transmits the information to the TPM as part of the TPM_CreateWrapKey command, at 536. As a result of this command, the TPM will generate a new child key containing the RAS as the authorization value. In a preferred embodiment, the TPM would then load the key created by this command into the TPM for later use.

In a further preferred embodiment of the arrangement above, where the user desired to sign an email using the operational key generated above, the present invention would:

1. The system requests User to swipe finger of child template, using a command such as SFPU_GetMinutiae;
2. Via the system generate the TPM_Sign command for the TPM;
3. The command data is sent to the SFPU, the fingerprint data is compared for authentication and, if matched, a TPM authorization digest is generated, using a command such as SFPU_AuthorizeTPM based on information in the child template;
4. The digest is appended to the TPM_Sign command; and,
5. The appended TPM_Sign command is sent to the TPM along with the digest of the email for signature generation.

The present invention includes a unique technique to generate secure codes in a remote device of a system and securely convey secure codes to the TPM, without exposing the secure codes to software attack or malware during normal operation.

Many other embodiments of the present invention are also envisioned. For example, in other embodiments, the present invention is directly applicable for other TPM entities such as owner authorization, delegated owner authorization, key migration authorization and sealed element authorization.

As used herein, terms such as personal computers, PCs, systems, and similar terms are intended to be used interchangeably, without distinction or limitation. Such systems may include but not be limited to servers, server-based systems, multi-chipset systems, touch sensitive systems, assemblies and devices therein, etc.

As used herein, the terms "remote", "peripheral", "device", and the like are intended to be used interchangeably but are not intended to be singular or necessarily specific to a particular connection technology such as being hardwired or wireless, but rather such terms are used with the understanding that the terms of interest are in or capable of being in operative communication with a system of the present invention.

As used herein, the terms "password", "access(es)", "codes", and the like are intended to be used interchangeably but are not intended to be singular or necessarily specific to any particular type of security format, protocol or technology, but rather such terms are used with the understanding that the terms of interest are in or capable of being used to create secure measures with a system of the present invention.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer system comprising:
    one or more central processing units connected to one or more internal system busses;
    random access memory;
    read-only memory;
    at least one input/output adapter, which supports various I/O devices;
    a user interface adapter;
    a trusted platform module configured to perform operations comprising:
    receiving a secure access code from a remote device outside of the trusted platform module;
    receiving usage authorization information generated by a secure generator, the usage authorization information being attached to the secure access code;
    recognizing the secure access code; and
    using the secure access code as a parameter for various trusted platform module commands.

2. The system of claim 1, wherein the operations further comprise reading data input at the remote device, and wherein the remote device includes data recognition software adapted in association with unique characteristics of user identifying data for capturing, authenticating and transmitting the data.

3. The system of claim 1, wherein the remote device is a biometric device capable of reading one or more of biometric data, fingerprint data, iris data, retinal data, temperature data, facial data, or vein patterns.

4. The system of claim 1, wherein the trusted platform module is configured to share a random authorization secret with the one or more central processing units.

5. The system of claim 4, wherein the random authorization secret is attached to a public key on the secure storage device.

6. The system of claim 1, wherein the trusted platform module is a companion chip situated interoperably with the central processing unit of the system.

7. The system of claim 1 wherein the secure access code is not known by a user.

8. The system of claim 1, wherein the secure access code is a high entropy password, keycode, random number, or alphanumeric complex.

9. The system of claim 1, wherein the secure access code is provided from a separate device.

10. The system of claim 9, wherein the separate device comprises any of a biometric processor, smart card, flash disk or other attached peripheral.

11. The system of claim 1, the operations further comprising initiating an object-specific authorization protocol session.

12. The system of claim 11, the operations further comprising saving at least one object-specific authorization protocol nonce.

13. The system of claim 12, the operations further comprising receiving a second template from the remote device in response to unique data characteristics received at the remote device.

14. The system of claim 13, the operations further comprising receiving a random secret from the remote device.

15. The system of claim 14, wherein the secret is securely stored or transmitted in association with the second template.

16. The system of claim 15, the operations further comprising receiving the shared secret from the remote device.

17. The system of claim 16, further comprising authenticating the unique data characteristics with an identifying template of the system associated with the unique data characteristics and transmitting secure content to remote device.

18. The system of claim 17, wherein the remote device is capable of receiving real-time input.

19. The system of claim 17, wherein the remote device is capable of reading biometric data.

20. The system of claim 19, wherein the biometric data is one of fingerprint data, iris data, retinal data, temperature data, facial data, vein patterns or similar other biometric-based data.

21. The system of claim 20, wherein the secure generation and storage on a third device provides an increased level of protection against unapproved snooping of the secure access code.

22. The system of claim 21, wherein the creation of secure access code includes trusted platform module-CreateWrapKey, trusted platform module_Seal and commands that create secure entities for later use.

23. The system of claim 22, wherein the authorization of the secure access code includes trusted platform module-Sign and other commands that require the authorization for entity usage.

24. The system of claim 23, wherein the authorization protocol is provided by the trusted platform module commands including those that require owner or operator authorization.

25. The system of claim 24, wherein the authorization values can be changed.

26. A non-transitory computer readable storage medium containing program instructions executed upon access by a trusted platform module to cause the trusted platform module to perform operations comprising:
    receiving a secure access code from a remote device outside of the trusted platform module;
    receiving usage authorization information generated by a secure generator, the usage authorization information being attached to the secure access code;
    recognizing the secure access code;

using the secure access code as a parameter for various trusted platform module commands.

27. The computer readable storage medium of claim 26 wherein the secure access code is not known by a user.

28. The computer readable storage medium of claim 26, wherein the secure access code is a high entropy password, keycode, random number, or alphanumeric complex.

29. The computer readable storage medium of claim 26, wherein the secure access code is provided from a separate device.

30. The computer readable storage medium of claim 29, wherein the separate device comprises any of a biometric processor, smart card and flash disk.

31. The computer readable storage medium of claim 26, wherein the trusted platfrom module shares a random authorization secret with one or more central processing units.

32. The computer readable storage medium of claim 31, wherein the random authorization secret is attached to a public key on the trusted platform module.

33. The computer readable storage medium of claim 26, the operations further comprising initiating an object-specific authorization protocol session.

34. The computer readable storage medium method of claim 33, the operations further comprising saving at least one object-specific authorization protocol nonce.

35. The computer readable storage medium of claim 34, the operations further comprising receiving a second template from the remote device in response to unique data characteristics received at the remote device.

36. The computer readable storage medium of claim 35, the operations further comprising receiving a random secret generated by the remote device.

37. The computer readable storage medium of claim 36, wherein the secret is securely stored or transmitted in association with the second template.

38. The computer readable storage medium of claim 37, the operations further comprising receiving the shared secret from the remote device.

39. The computer readable storage medium of claim 38, the operations further comprising authenicating the unique data characteristics with an identifying template associated with the unique data characteristics and transmitting secure content to remote device.

40. The computer readable storage medium of claim 39, wherein the remote device is capable of receiving real-time input.

41. The computer readable storage medium of claim 39, wherein the remote device is capable of reading biometric data.

42. The computer readable storage medium of claim 41, wherein the biometric data is one of fingerprint data, iris data, retinal data, temperature data, facial data, vein patterns or similar other biometric-based data.

43. The computer readable storage medium of claim 41, wherein the trusted platform module is a companion chip situated interoperably with a central processing unit.

44. The computer readable storage medium of claim 43, wherein the secure generation and storage on a third device provides an increased level of protection against unapproved snooping of the secure access code.

45. The computer readable storage medium of claim 44, wherein the secure access codes include a trusted platform module-CreateWrapKey, a trusted platform module_Seal and other commands that create secure entities for later use.

46. The computer readable storage medium of claim 45, wherein the authorization of the secure access code comprises a trusted platform module-Sign and other commands that require the authorization for entity usage.

47. The computer readable storage medium of claim 46, wherein the authorization protocol comprises one or more trusted platform module commands that require owner or operator authorization.

48. The computer readable storage medium of claim 47, wherein the authorization values can be changed.

* * * * *

UNITED STATES PATENT AND TRADEMARK OFFICE
CERTIFICATE OF CORRECTION

PATENT NO. : 8,261,072 B2
APPLICATION NO. : 11/607504
DATED : September 4, 2012
INVENTOR(S) : Kerry David Maletsky Page 1 of 1

It is certified that error appears in the above-identified patent and that said Letters Patent is hereby corrected as shown below:

Page 2, Column 2, Other Publications, Line 15, delete "11/603,496," and insert -- 11/603,495, --, therefor.

Column 5, Line 48, before "software" delete "insecure" (second occurrence).

Column 11, Line 15, in Claim 31, delete "platfrom" and insert -- platform --, therefor.

Column 11, Line 23, in Claim 34, after "medium" delete "method".

Column 12, Line 2, in Claim 39, delete "authenicating" and insert -- authenticating --, therefor.

Signed and Sealed this
Twenty-third Day of October, 2012

David J. Kappos
*Director of the United States Patent and Trademark Office*